Oct. 21, 1952     G. W. ASHLOCK, JR     2,614,594

CASEHARDENED RUBBER PITTING CHUCK

Filed Oct. 27, 1950

INVENTOR.
George W. Ashlock
ECKHOFF & SLICK
ATTORNEYS
By Robert A. ...
A MEMBER OF THE FIRM Patented Oct. 21, 1952

2,614,594

UNITED STATES PATENT OFFICE 2,614,594

CASEHARDENED RUBBER PITTING CHUCK

George W. Ashlock, Jr., Oakland, Calif.

Application October 27, 1950, Serial No. 192,619

1 Claim. (Cl. 146—19)

This invention relates to an improved fruit pitting chuck.

It is usual to support fruit undergoing first orientation and later pitting in a rubber chuck to provide a resilient support for the fruit while some portion of the fruit, such as a contained stone, is removed by forceful application of a knife. One can refer to my Patents 2,209,305; 2,314,862 and 2,528,294 for typical showings of such fruit pitting chucks; the invention, however, is not limited to these chucks for it is applicable generally to fruit pitting chucks.

The fruit pitting chucks generally comprise a base having a cavity therein providing a fruit receptacle which can take various forms, being generally spherical or conoidal in configuration to provide support for the fruit during orientation and pitting. To ensure that the fruit can be turned readily into a desired position in the chuck, as by any of the usual orienting force applying means, of which those shown in Patents 1,742,653; 2,288,062; 2,296,490 and 2,406,311 are typical, it has been usual to wet the rubber chuck with various materials such as water containing a wetting agent, as is disclosed in Patent No. 2,308,038, or with water and an edible oil, as is disclosed in Patent 2,123,644.

I have observed that even though the rubber pitting chuck was lubricated with one of the aforementioned lubricants, even then the chuck, after a period of prolonged use, did not permit the fruit to be oriented as readily as when the chuck was new; the percentage of fruit attaining a final desired position being less than that achieved with a like machine utilizing new rubber pitting chucks. This was observed by utilizing two identical machines except that one was equipped with new rubber pitting chucks and the other had chucks which had been utilized for a considerable period of time, the two machines being fed from the same batch of fruit lot so that there was no difference in the feed. In the case of the new chucks, the percentage of fruit turned into a desired position was materially higher than in the fruit handled in the old chucks. Upon further examination, I determined that even in the presence of the wetting agents or other substances utilized to maintain the chucks wet during orientation of the fruit, the chucks pick up a waxy substance from the fruit surface, which substance adheres to the surface of the cavity in the rubber chucks, filling the pores and increasing the friction of the fruit in the cavity during orientation even though the cavity is maintained wet with various lubricants. Apparently the surface of the rubber cavity is relatively porous and the waxy coating on the fruit surface enters into the rubber and provides a contact film having a relatively high co-efficient of friction with the fruit. This is quite unexpected inasmuch as it is to be remembered that such machines do not operate upon fresh fruit but upon fruit which has been processed and has been retained in a brine such as a calcium hyposulphite solution for a relatively long period of time; one would expect the wax in the fruit to have been saponified or otherwise altered by such treatment and to have been removed long prior to the fruit being subjected to pitting.

I have determined that the surface of the chuck cavity can be modified to provide one which is non-tacky and which continues to have a relatively low co-efficient of friction by a chemical case hardening. This is achieved by forming the rubber pitting chuck in any desired manner, e. g. compounding and then vulcanizing the chucks in the usual manner, and thereafter subjecting at least the cavity to the case hardening action of various chemicals. One broad class of case hardening agents which can be utilized are oxidizing agents, the rubber chucks being submitted to a surface treatment with an aqueous solution of an oxidizing agent for a relatively short period of time and, if desired, treated with a neutralizing alkali and then dried. As an oxidizing agent, one can use the various halogens such as fluorine, chlorine, bromine or iodine, or substances providing an oxidizing solution such as the various alkaline hypochlorides. For example, a treatment with a 2% solution of sodium hypochloric water at room temperature for a period of 10 to 15 minutes, or a treatment with a 10% solution of sodium hypochlorite for a period of approximately 45 to 60 seconds, followed by rinsing for a few minutes in a dilute alkali such as a 3% aqueous ammonium hydroxide solution, will produce the desired surface. If a more vigorous application is desired, the hypochlorite solution can be acidified to make it more active.

One can also utilize other oxidizing substances such as potassium dichromate. Specifically, a neutral saturated solution of potassium dichromate and water was applied to the rubber pitting chucks for a period of about 20 minutes, the chucks then being rinsed for a few minutes with a 3% solution of ammonium hydroxide. A reduction in the time of treatment can be effected by treating the rubber chucks with an aqueous solution of chromic acid, or potassium dichromate and sulfuric acid. One can also utilize hydrogen peroxide in water solution, the treatment time varying with the strength of the solution.

As other oxidizing agents useful in providing the desired "case hardening" on the chuck surface, one can utilize a hydrogen halide such as hydrogen chloride, applying this as a gas or under such condition that it is a liquid. The same affect can be secured by application of what I classify as strong mineral acids such as nitric acid, sulfuric acid, hydrochloric acid, chromic acid, hydriodic and hydrobromic acids. Application of any of these will result in the desired "case hardening."

It is essential to coordinate the strength of the acid solution with the time of contact. For example, utilizing a mixture of 80 parts of concentrated nitric acid and 20 parts of concentrated sulfuric acid, the rubber chucks were dipped for a period approximating five seconds. If a relatively long period, for example, of the order of five minutes is employed, then the articles become too hard and the surfaces become deeply cracked.

By treating the rubber pitting chucks to provide them with a case hardened surface, I have been able to provide a substantially constant degree of orientation which did not diminish as the chucks became older, as is the case with untreated chucks. By the term "case hardened surface," I mean a rubber pitting chuck wherein only the surface of the rubber chuck has been affected and the rubber interior of the chuck remains unchanged and unaffected, the treatment being limited to a depth of from 0.001 to about 0.003 inch and usually not in excess of 0.005 inch. One can treat the entire chuck or merely the cavity, as desired, to provide the smooth, wax-impervious surface. Those skilled in the art can readily suit the period of contact and solution strength to provide the case hardened cavity surface.

In the drawing accompanying and forming a part hereof, I have illustrated a typical environment in which the invention can be utilized. In the drawings, Figure 1 is a plan view showing a fruit pitting chuck assembly.

Figure 1:
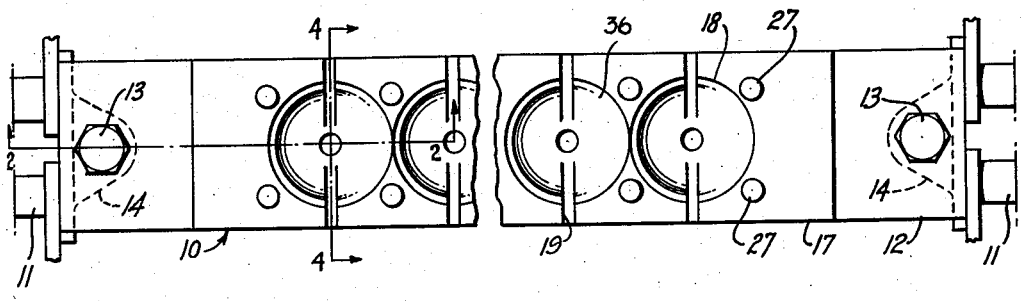
Figure 2:
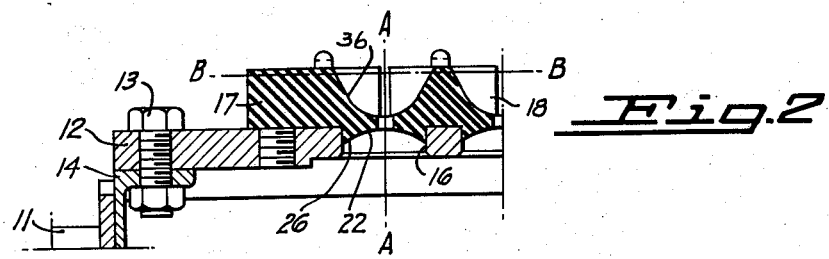
Figure 2 is a section taken along the line 2—2 of Figure 1.

The fruit pitting device of the present invention comprises a structure generally indicated at 10 and adapted to be mounted between opposite conveyor chains 11 in the manner disclosed in my aforementioned Patents 2,157,518 and 2,219,832, the chains being movable to convey fruit positioned upon the fruit pitting chuck to suitable pitting mechanism such as that disclosed in said patents. Each chuck is made up of a metal base plate 12, the plate being in the form of a channel and secured by bolts 13 to a bracket 14 extending from each of the conveyor chains in a well-known manner.

Each plate 12 includes a plurality of apertures 16. These are usually circular in cross section but their form can be varied so long as it does not interfere with the functioning of the mechanism utilized to process the fruit, such as the aforementioned pitting mechanism.

To provide for actual reception of the fruit to be carried and processed, I provide a facing sheet 17 of a suitable resilient material such as natural rubber, which has been treated, as previously described. The facing sheet 17 is preferably flat on its upper face so that when a plurality of individual pitting devices 10 are attached between the conveyor chains 11, they form a flat continuous work surface with the rubber facing sheet uppermost.

Each sheet 17 includes a series of suitable fruit receiving receptacles 18; each receptacle may be cut or slotted as at 19 to permit the functioning of the orienting mechanism shown in my Patents Nos. 2,212,892 and 2,212,893, wherein rod-like members are extended through the slots to apply a turning or rotative force to the fruit. Such a force can also be applied by mechanisms as are shown in my Patents 2,213,893, 2,296,490, 2,387,709, and 2,406,311. In addition, the slots permit the use of knives, saws or the like to sever the fruit subsequently, as desired.

Each receptacle 18 includes an aperture 21 provided adjacent the bottom thereof to permit the fruit pit or stone to be ejected. In addition, the bottom of each receptacle 18 is formed with a depending portion 26 which fits snugly against the sides of plate 12 and which define the aperture 16 to lend support to that portion of the receptacle which extends across the aperture 16. Also, the face 22, defining the bottom portion of the receptacle extending across the aperture 16, is made slightly concave to provide resilient support for the aperture 18.

Each facing sheet 17 is positioned detachably on the base plate 12 by a plurality of pins 27, pressed into the base plate and which extend upwardly therefrom into suitable apertures formed in the resilient facing strip 17, four pins are preferably provided about each receptacle, the pins being spaced 90° apart.

Figure 3:
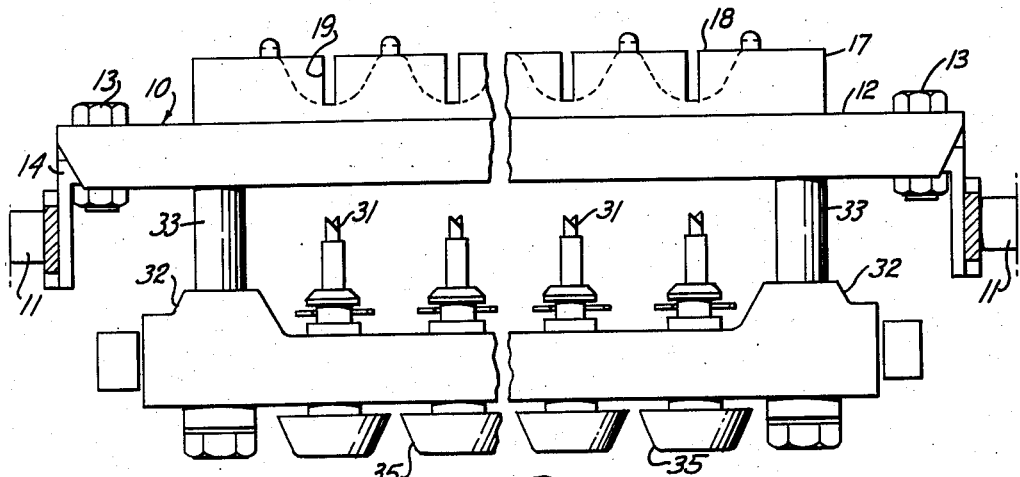
Figure 3 is a side elevation, partly in section, showing the fruit pitting chuck of the present invention in conjunction with suitable means for turning the fruit into a position wherein it is in a desired position of alignment.
Figure 4:
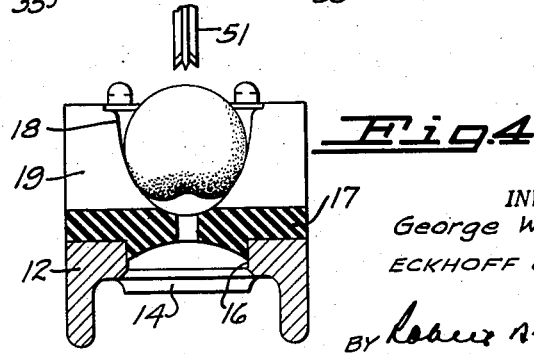
Figure 4 is a section along the line 4—4 of Figure 1, illustrating orientation of a cherry or the like into a desired position of alignment.

Referring particularly to Figure 3, I have shown suitable fruit orienting means of the type generally disclosed in my Patent 2,406,311. This means comprises a plurality of toothed rods 31 rotatably mounted in a cross-member 32, which is slidable upon guides 33 attached to each plate 12. When a toothed rod 31 is projected upwardly to within the cavity 18 by suitable driving engagement of wheels 35 and sliding of member 32 upon rods 33, the fruit is engaged, as is disclosed in my Patent 2,406,311, and is turned until the dimpled end of the fruit is down. One can, of course, use other orienting means, as I have indicated, in place of that herein disclosed, to apply an orienting force to the fruit; such a force can be applied by any of the known orienting devices to which I have heretofore made reference such as rotatable pins or wheels or the vibrating rods.

In the drawings, I have indicated at 36 the surface of the chuck which is case hardened in accordance with the present invention.

I claim:

A vulcanized rubber fruit chuck having a cavity therein to receive and retain a fruit during orientation and pitting thereof, the surface defining said cavity being provided by a thin oxidized layer of vulcanized rubber and having a mirror-like finish which is non-adherent and impervious to any natural wax and sugar on the surface of fruit oriented and pitted while in the cavity.

GEORGE W. ASHLOCK Jr.

REFERENCES CITED

The following references are of record in the file of this patent:

UNITED STATES PATENTS

| Number | Name | Date |
| --- | --- | --- |
| 1,479,394 | Meade | Jan. 1, 1924 |
| 1,928,988 | Watkins | Oct. 3, 1933 |
| 2,123,644 | Wormser | July 12, 1938 |
| 2,133,588 | Steinward | Oct. 18, 1938 |